United States Patent
Asaka et al.

(10) Patent No.: US 9,701,053 B2
(45) Date of Patent: Jul. 11, 2017

(54) FIXING MEMBER MANUFACTURING APPARATUS

(71) Applicant: CANON KABUSHIKI KAISHA, Tokyo (JP)

(72) Inventors: Akeshi Asaka, Kashiwa (JP); Shuichi Tamura, Moriya (JP); Hiroto Sugimoto, Toride (JP); Shinsuke Takahashi, Kashiwa (JP); Shigeaki Takada, Abiko (JP); Takeshi Suzuki, Yokohama (JP); Jun Miura, Kawasaki (JP); Yutaka Arai, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 133 days.

(21) Appl. No.: 14/741,750

(22) Filed: Jun. 17, 2015

(65) Prior Publication Data

US 2015/0367544 A1    Dec. 24, 2015

(30) Foreign Application Priority Data

Jun. 23, 2014   (JP) ................................. 2014-128146
May 21, 2015   (JP) ................................. 2015-103560

(51) Int. Cl.
   B29C 45/14    (2006.01)
   B29C 45/22    (2006.01)
   (Continued)

(52) U.S. Cl.
   CPC .............. B29C 45/22 (2013.01); B29C 45/14 (2013.01); B29C 45/34 (2013.01); B29C 45/73 (2013.01);
   (Continued)

(58) Field of Classification Search
   CPC ......... B29C 45/22; B29C 45/14; B29C 45/34; B29C 45/73; B29C 14/14598; B29L 2031/767; B29K 2105/18
   (Continued)

(56) References Cited

U.S. PATENT DOCUMENTS 1,745,482 A  *  2/1930  Goodwin ................ B29C 45/14
                                                    264/262
2,880,460 A  *  4/1959  Monett .................... B29C 33/76
                                                    425/191
(Continued)

FOREIGN PATENT DOCUMENTS

CN    1329976 A     1/2002
CN    1387207 A    12/2002
(Continued)

OTHER PUBLICATIONS

Extended European Search Report in European Application No. 15172052.1 (mailed Nov. 20, 2015).
(Continued)

*Primary Examiner* — Robert B Davis
(74) *Attorney, Agent, or Firm* — Fitzpatrick, Cella, Harper & Scinto

(57) ABSTRACT

A manufacturing apparatus for manufacturing a fixing member includes: a metal mold capable of holding a base material of the fixing member in an inside thereof; and an injecting member including a group of openings configured to inject a liquid rubber containing a needle-like filler into the metal mold in which the base material is held. The injecting member is configured so that a ratio of a total perimeter of the group of openings to a sum of a perimeter of an inner surface of the metal mold and an outer surface of the base material is 1.3 or more and 3.3 or less.

7 Claims, 9 Drawing Sheets

(51) Int. Cl.
    *B29C 45/34*     (2006.01)
    *B29C 45/73*     (2006.01)
    *B29K 27/12*     (2006.01)
    *B29K 105/16*    (2006.01)
    *B29K 507/04*    (2006.01)
    *B29K 705/00*    (2006.01)
    *B29K 83/00*     (2006.01)
    *B29L 31/00*     (2006.01)
    *G03G 15/20*     (2006.01)

(52) U.S. Cl.
    CPC ........ *G03G 15/206* (2013.01); *B29K 2027/12* (2013.01); *B29K 2083/005* (2013.01); *B29K 2105/16* (2013.01); *B29K 2507/04* (2013.01); *B29K 2705/00* (2013.01); *B29K 2905/00* (2013.01); *B29K 2995/0013* (2013.01); *B29L 2031/767* (2013.01); *G03G 15/2057* (2013.01); *G03G 2215/2035* (2013.01)

(58) Field of Classification Search
    USPC ........................................................ 264/108
    See application file for complete search history.

(56) References Cited

U.S. PATENT DOCUMENTS

| | | | | |
|---|---|---|---|---|
| 3,380,120 | A * | 4/1968 | Rowland | B29C 45/14 |
| | | | | 156/500 |
| 3,613,168 | A * | 10/1971 | Rowland | B29C 45/14491 |
| | | | | 264/266 |
| 3,724,983 | A * | 4/1973 | Nelson | B29C 45/14491 |
| | | | | 425/128 |
| 3,771,933 | A * | 11/1973 | Rowland | B29C 45/14 |
| | | | | 249/96 |
| 3,941,635 | A * | 3/1976 | Tavelle | B29C 63/346 |
| | | | | 156/267 |
| 4,113,825 | A * | 9/1978 | Hill | B29C 45/1418 |
| | | | | 264/262 |
| 4,288,058 | A * | 9/1981 | Inman | B29C 45/14491 |
| | | | | 249/114.1 |
| 5,089,201 | A * | 2/1992 | Takahashi | B29C 33/0044 |
| | | | | 156/287 |
| 5,741,446 | A | 4/1998 | Tahara et al. | |
| 5,893,210 | A * | 4/1999 | Takei | B28B 1/24 |
| | | | | 264/274 |
| 6,185,751 | B1 * | 2/2001 | Mason | A41B 11/002 |
| | | | | 2/239 |
| 6,438,841 | B1 * | 8/2002 | Fuma | B29C 45/14622 |
| | | | | 264/269 |
| 6,440,347 | B1 * | 8/2002 | Izawa | B29C 45/14491 |
| | | | | 264/262 |
| 6,961,991 | B2 | 11/2005 | Fuseya et al. | |
| 7,069,640 | B2 | 7/2006 | Fuseya et al. | |
| 8,626,046 | B2 | 1/2014 | Sekihara et al. | |
| 8,688,023 | B2 | 4/2014 | Sekihara et al. | |
| 8,889,050 | B2 | 11/2014 | Nitsch | |
| 8,944,797 | B2 | 2/2015 | Misonoo et al. | |
| 9,285,735 | B2 * | 3/2016 | Yajima | G03G 15/206 |
| 2012/0014726 | A1 | 1/2012 | Sekihara et al. | |
| 2014/0301763 | A1 | 10/2014 | Miura et al. | |
| 2015/0071690 | A1 | 3/2015 | Miyahara et al. | |
| 2015/0160596 | A1 | 6/2015 | Asaka et al. | |

FOREIGN PATENT DOCUMENTS

| | | |
|---|---|---|
| CN | 102257441 A | 11/2011 |
| CN | 102692853 A | 9/2012 |
| JP | 4-158011 A | 6/1992 |
| JP | 2002-351243 A | 12/2002 |
| RU | 2492046 C2 | 9/2013 |
| WO | 2010/074320 A1 | 7/2010 |

OTHER PUBLICATIONS

S.I. Ozhegov, Dictionary of the Russian Language, 22nd ed., pp. 98 and 238 (1990).
Official Action in Russian Application No. 2015123688/05 (Dec. 20, 2016).
Decision on Grant in Russian Application No. 2015123688/05 (Apr. 7, 2017).

* cited by examiner (a)

(b)

FIXING MEMBER MANUFACTURING APPARATUS

FIELD OF THE INVENTION AND RELATED ART

The present invention relates to a manufacturing apparatus of a fixing member used in a fixing device mounted in an image forming apparatus such as a copying machine, a printer or a facsimile machine.

An image forming apparatus of an electrophotographic type includes a fixing device for fixing a toner image, formed on a recording material (hereinafter referred to as a sheet), on the recording material (sheet) by heating and pressing the toner image. This fixing device includes a fixing member such as a heating roller (heating belt) or a pressing roller (pressing belt) and has a constitution in which a fixing process is performed at a position where these rollers (belts) are press-contacted to each other.

In such a fixing device, it has been known that when a sheet (small-sized sheet) smaller in width than a sheet having a maximum width (size) usable in the device is continuously passed through the device, a non-sheet-passing region of the fixing member is excessively increased in temperature (hereinafter referred to as non-sheet-passing portion temperature rise).

This non-sheet-passing portion temperature rise is liable to generate with a higher processing speed (process speed) of the image forming apparatus. This is because a time in which the sheet passes through a fixing nip becomes short with speed-up, and therefore a heat quantity for fixing the toner image on the sheet is required to be increased.

In this way, when the non-sheet-passing portion temperature rise generates, the temperature exceeds a heat-resistant temperature of each of members constituting the fixing device and therefore the processing speed is lowered. That is, the non-sheet-passing portion temperature rise leads to a lowering in productivity of image formation.

In order to suppress the lowering in productivity, in a device disclosed in Japanese Laid-Open Patent Application 2002-351243, a thermal conductivity of the pressing roller with respect to an axial direction of the pressing roller is intended to be enhanced.

Specifically, a needle-like filler high in thermal conductivity is dispersed in a rubber layer constituting the pressing roller.

Further, Japanese Laid-Open Patent Application Hei 4-158011 discloses a method of molding a rubber layer of the heating roller. Specifically, this method is such a method that a core metal is set in a metal mold, and then a liquid rubber is injected into between a metal mold inner surface and a core metal outer surface (hereinafter referred to as a casting method).

However, according to study the present inventors, when a liquid rubber in which a needle-like filler is dispersed is injected into a metal mold by using this casting method, it turned out that a problem can generate. That is, depending on a constitution of an injecting member provided with an opening for permitting injection of the liquid rubber into the metal mold, it turned out that the needle-like filler is not oriented along an injection direction of the liquid rubber as in an assumed manner.

SUMMARY OF THE INVENTION

According to an aspect of the present invention, there is provided a manufacturing apparatus for manufacturing a fixing member, comprising: a metal mold capable of holding a base material of the fixing member in an inside thereof; and an injecting member including a group of openings configured to inject a liquid rubber containing a needle-like filler into the metal mold in which the base material is held, wherein the injecting member is configured so that a ratio of a total perimeter of the group of openings to a sum of a perimeter of an inner surface of the metal mold and an outer surface of the base material is 1.3 or more and 3.3 or less.

These and other objects, features and advantages of the present invention will become more apparent upon a consideration of the following description of the preferred embodiments of the present invention taken in conjunction with the accompanying drawings.

DESCRIPTION OF EMBODIMENTS

Embodiments

Embodiments of the present invention will be specifically described with reference to the drawings. First, a fixing device according to this embodiment will be described using a schematic sectional view of FIG. 1. As a fixing member according to the present invention, a pressing roller used in the fixing device will be described in detail by taking it as an example.

Figure 9:
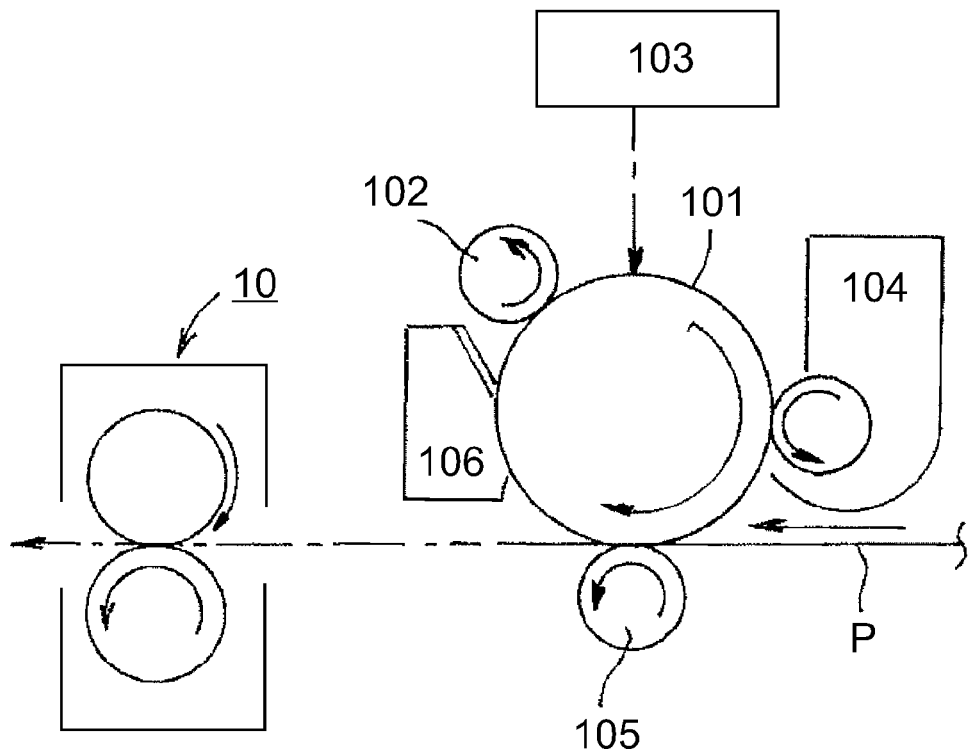
FIG. 9 is a schematic structural view of an example of an electrophotographic image forming apparatus.

As an electrophotographic image forming apparatus, an apparatus as shown in FIG. 9 is used. This apparatus includes a rotating photosensitive member 101, a charging means 102 and an image exposure means 103 which are a latent image forming means, and a developing means 104 for developing a latent image, formed on the photosensitive member, with a toner. Further, the apparatus includes a transfer means 105 for transferring a toner image obtained by developing the latent image, a cleaning means 106 for cleaning a photosensitive member surface after toner image transfer, and a fixing device 10 as a fixing means for fixing the toner image on a recording material, and the like.

[Fixing Device]

Figure 1:
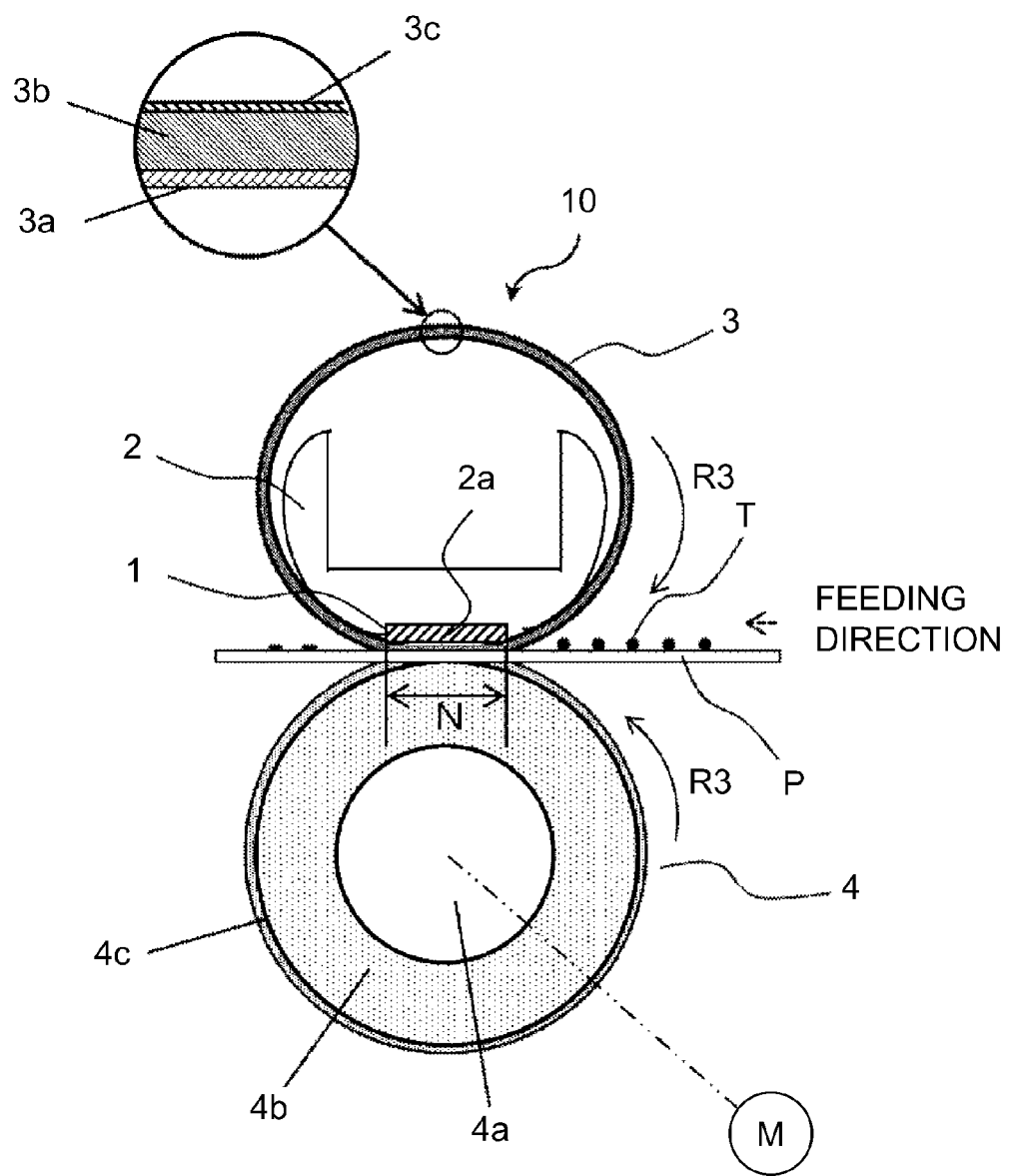
FIG. 1 is a schematic sectional view showing a structure of a fixing device according to an embodiment.

The fixing device 10 shown in FIG. 1 includes a ceramic heater 1 as a heating member, a heater holder 2 as a heating member supporting member, a fixing belt 3 as a fixing member, and a pressing roller 4 as an elastic roller.

The heater 1 includes a heat generating source such as a heat generating resistor generating by being supplied with electric power by an unshown electric power supplying means, and abruptly increase in temperature by supply of electric power. A temperature of the heater is detected an unshown temperature detecting means, and detected temperature information is inputted into an unshown control means. The control means controls supplied electric power from the electric power supplying means to the heat generating source so that a detected temperature inputted from the temperature detecting means, and thus temperature-controls the temperature of the heater 1 at a predetermined temperature.

The heater 1 is fixedly supported by a heater holder 2 formed of a heat-resistant material having rigidity in a substantially semicircular trough shape in cross section. Specifically, at a lower surface of the holder 2, a groove portion 2a is provided along a holder longitudinal direction (front-rear direction on the drawing sheet of FIG. 1), and the heater 1 is fitted (engaged) in the groove portion 2a.

The fixing belt 3 includes, from an inside to an outside, a ring-shaped base material 3a, a belt elastic layer 3b (referred herein for being distinguished from an elastic layer 4b of the pressing roller 4 described later), and a surface layer 3c. The fixing belt 3 is an endless belt having an inner peripheral surface on which the heater 1 and the holder 2 slide, and is fitted around an outer periphery of the holder 2 supporting the heater 1 with a margin of a perimeter.

As described later, the heater 1 and the pressing roller 4 are press-contacted to the fixing belt 3, so that a fixing nip N is formed between the fixing belt 3 and the pressing roller 4. The fixing belt 3 is hermetically contacted at an inner surface thereof to a heater surface by rotationally driving the pressing roller 4 in the counterclockwise direction of an arrow R4 at a predetermined peripheral speed by a rotationally device M such as a motor, and is rotated in the clockwise direction of an arrow R3 by rotation of the pressing roller 4 around the holder 2 while sliding on the heater surface.

The holder 2 functions as not only a holding member for the heater 1 but also a rotation guide member for the fixing belt 3. Onto the inner peripheral surface of the fixing belt 3, a lubricant (grease) is applied for ensuring a sliding property with the heater 1 and the holder 2. Incidentally, herein, the belt includes a film-shaped member.

The pressing roller 4 as a fixing member includes, from an inside to an outside, a base material (core metal) 4a, an elastic layer (rubber layer) 4b and a parting layer 4c. The pressing roller 4 is rotationally driven during use by the rotationally driving device M. For this reason, the base material 4a is rotatably supported by an unshown fixing portion such as a frame of the fixing device 10 via a bearing member.

The pressing roller 4 is provided at a position opposing the heater 1, via the fixing belt 3, supported by the holder 2. Further, the pressing roller 4 and the fixing belt 3 are press-contacted to each other by imparting predetermined pressure to the pressing roller 4 and the fixing belt 3 by an unshown pressing mechanism, so that each of the elastic layers 3b and 4b is elastically deformed. As a result, between the pressing roller 4 and the fixing belt 3, the fixing nip N having a predetermined width with respect to a recording material feeding direction (sheet feeding direction) is formed.

When the pressing roller 4 is rotationally driven by the rotationally driving device M, the pressing roller 4 feeds a sheet (recording material) P while nipping the sheet P at the fixing nip P between itself and the fixing belt 3 rotated by the pressing roller 4. Further, the fixing belt 3 is heated until the surface temperature thereof reaches a predetermined temperature (e.g., 200° C.) by the heater 1. In this state, when the sheet P on which an unfixed toner image is formed with an unfixed toner T is nip-fed through the fixing nip N, the unfixed toner T on the sheet P is heated and pressed. Then, the unfixed toner T is melted and color-mixed, and therefore the unfixed toner T is thereafter cooled, whereby the unfixed toner image is fixed as a fixed image on the sheet P.

[Fixing Belt]

The fixing belt 3 will be described. The fixing belt 3 is, as shown in FIG. 1, provided with the belt elastic layer 3b on an outer periphery of the base material 3a and the surface layer 3c on an outer periphery of the belt elastic layer 3b. In view of necessity that the base material 3a requires a heat-resistant property and a flex resistance, a heat-resistant resin material such as polyimide, polyamideimide or polyether ether ketone (PEEK) is used.

If also a thermo-conductive property is taken into consideration, for the base material 3a, a metallic material, such as stainless steel (SUS), nickel (Ni) or nickel alloy, which has a higher thermal conductivity than the heat-resistant resin material may also be used. Further, for the base material 3a, there is a need to increase a mechanical strength while decreasing a thermal capacity, and therefore a thickness of the base material 3a may desirably be 5 μm-10 μm, preferably 20 μm-85 μm.

The belt elastic layer 3b is a silicone rubber layer for coating the outer periphery of the base material 3a. The belt elastic layer 3b uniformly applies heat to the unfixed toner T so as to enclose the unfixed toner T on the sheet P when the sheet P passes through the fixing nip N. The belt elastic layer 3b functions in such a manner, so that a good image having a high glossiness and with no fixing non-uniformity can be obtained.

However, when the belt elastic layer 3b is thin, sufficient elasticity cannot be obtained, so that the good image cannot be obtained. On the other hand, when the belt elastic layer 3b is thick, the thermal capacity becomes large, so that it takes much time to reach a predetermined temperature by the heating. For that reason, the thickness of the belt elastic layer 3b may desirably be 30 μm-500 μm, preferably 100 μm-300 μm.

The belt elastic layer 3b is not particularly restricted, but from various reasons that processing is easy, that the belt elastic layer 3b can be processed with high dimension accuracy and that a reaction by-product does not generate during heat-curing and the like reason, a liquid silicone rubber of an addition reaction cross-linking type may preferably be used. The liquid silicone rubber of the addition reaction cross-linking type contains, e.g., organopolysiloxane and organohydrogenpolysiloxane and may also further contain a catalyst and another additive. The organopolysiloxane is a base polymer obtained from a silicone rubber as a starting material, and the organopolysiloxane of 5,000-100,000 in number-average molecular weight and 10,000-50,000 in weight-average molecular weight may preferably be used.

The liquid silicone rubber is a polymer having a flowability at room temperature, but is cured by heating and after the curing, has a low hardness properly and has a sufficient heat-resistant property and a deformation recovery force. For that reason, the liquid silicone rubber is suitably used for not only the belt elastic layer 3b but also the elastic layer 4b of the pressing roller 4 described later.

Incidentally, if the belt elastic layer 3b is formed by the silicone rubber alone, the thermal conductivity of the belt elastic layer 3b becomes low. When the thermal conductivity of the belt elastic layer 3b is low, heat generated by the heater 1 does not readily conduct to the sheet P via the fixing belt 3, and therefore when the toner is fixed on the sheet P, heating is insufficient, so that an image defect such as fixing non-uniformity can occur.

Therefore, in order to increase the thermal conductivity of the belt elastic layer 3b, in the belt elastic layer 3b, e.g., a granular high heat-conductive filler having a high thermal conductivity is mixed and dispersed. As the granular high heat-conductive filler, silicon carbide (SiC), zinc oxide (ZnO), alumina ($Al_2O_3$), aluminum nitride (AlN), magnesium oxide (MgO), carbon black and the like are used.

Further, depending on the purpose, a needle-like high heat-conductive filler or the like, not the granular high heat-conductive filler may also be used. That is, as a shape of the high heat-conductive filler, other than the granular shape and the needle-like shape, there are a pulverized shape, a plate shape, a whisker shape and the like shape, so that a material having any of these shapes may also be used for the belt elastic layer 3b. Further, these materials may be used singly or in mixture of two or more species thereof. Incidentally, the high heat-conductive filler is contained in the belt elastic layer 3b, so that also electroconductivity is imparted to the belt elastic layer 3b.

The surface layer 3c is a fluorine-containing resin layer for coating the outer periphery of the belt elastic layer 3b. The surface layer 3c is provided for causing the toner to be less deposited on the fixing belt 3. For the surface layer 3c, a fluorine-containing resin material such as tetrafluoroethylene-perfluoroalkylvinylether copolymer (resin material) (PFA), tetrafluoroethylene resin material (PTFE) or tetrafluoroethylene-hexafluoropropylene copolymer (resin material) (FEP) may preferably be used. The thickness of the surface layer may desirably be 1 μm-50 μm, preferably 8 μm-25 μm. Incidentally, the surface layer 3c may only be required to be formed on the outer periphery of the belt elastic layer 3b by coating a fluorine-containing resin tube on the outer periphery or by applying paint consisting of the fluorine-containing resin material onto the outer periphery.

[Pressing Roller]

Figure 2:
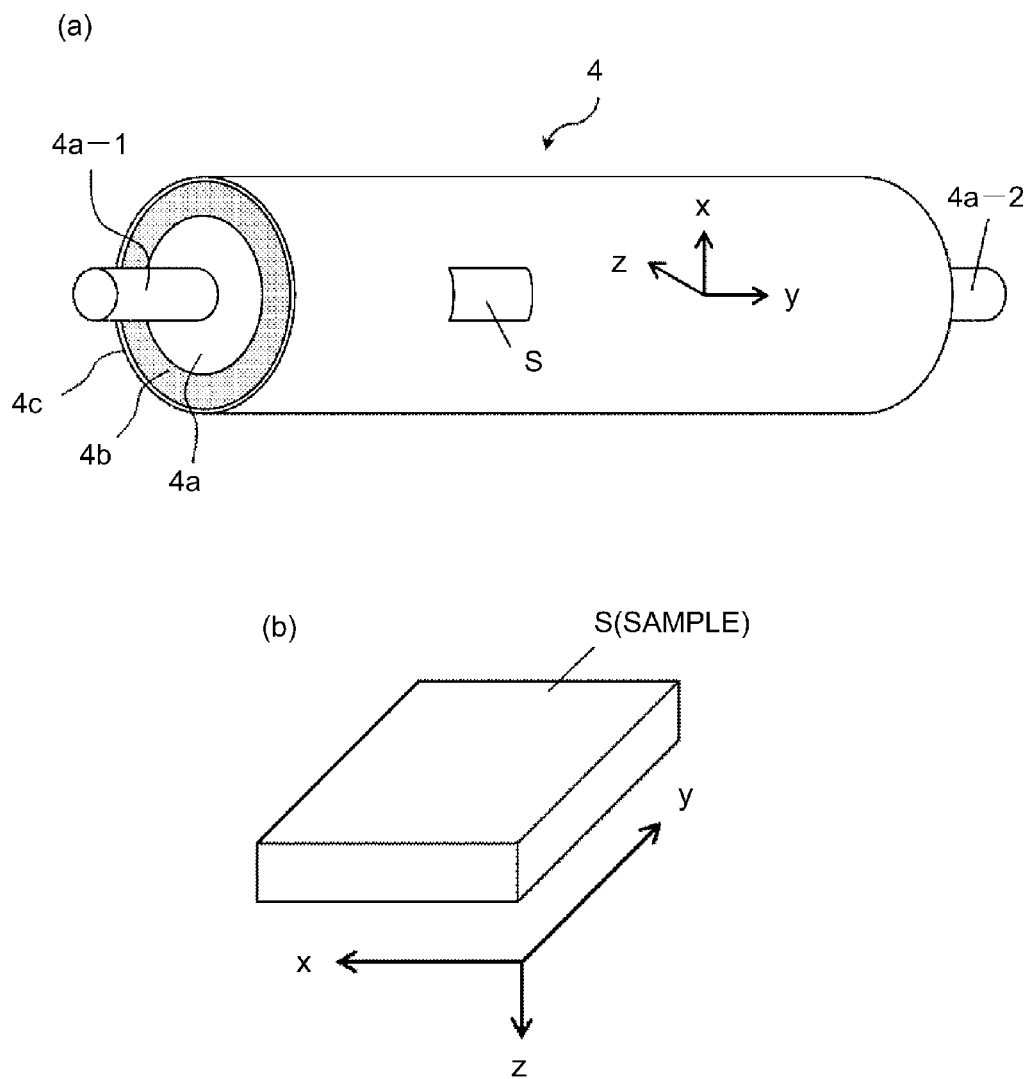
In FIG. 2, (a) is a perspective view showing a general structure of a pressing roller, and (b) is an illustration of a sample to be measured for the roller.

The pressing roller 4 will be described. In FIG. 2, (a) is a perspective view of the pressing roller 4 which is an elastic roller. The pressing roller 4 is formed in a plural layer structure including, on an outer periphery of a cylindrical base material 4a, an elastic layer 4b formed concentrically with the base material 4a and a parting layer 4c coated on an outer periphery of the elastic layer 4b. Incidentally, as shown in (a) of FIG. 2, in the following, a circumferential direction of the pressing roller 4 is represented by "x" direction, an axial direction of the pressing roller 4 is represented by "y" direction, and a thickness direction (radial direction) of the pressing roller 4 is represented by "z" direction.

<Base Material>

The cylindrical base material 4a is a shaft core material or a core metal formed using stainless steel, containing a steel material such as an SUM material (sulfur or sulfur composite free-cutting steel material) plated with nickel or chromium, phosphor bronze or aluminum. An outer diameter of the base material 4a may only be required to be 4 mm-80 mm. Small-diameter shaft portions 4a-1 and 4a-2 are provided in one end-side and the other end-side, respectively, of the base material 4a so as to be concentric with the base material 4a. Each of the small-diameter shaft portions 4a-1 and 4a-2 provided in one end-side and the other end-side, respectively, is a portion rotatably supported by an unshown fixing portion such as a frame of the fixing device 10.

<Elastic Layer>

The elastic layer 4b is a rubber coating the outer periphery of the base material 4a. The elastic layer 4b may preferably use the silicone rubber similarly as in the belt elastic layer 3b of the fixing belt 3. The elastic layer 4b may also be formed as a so-called porous elastic layer (foam sponge rubber) in which air bubbles (cells) or water is dispersed in order to enhance a heat-resistant property with respect to the layer thickness direction (z direction). Further, when the elastic layer is formed, as a liquid material, a liquid rubber mixture in which a needle-like filler is dispersed in a liquid rubber is used. The needle-like filler is a high heat-conductive filler, and is dispersed into the elastic layer, so that a heat flow path can be formed.

Further, when the needle-like high heat-conductive filler is kneaded in the above-described liquid silicone rubber of the addition reaction cross-linking type before the curing, the high heat-conductive filler has an elongated fiber shape, and therefore tends to orient along a direction of a flow of the liquid rubber when the high heat-conductive rubber elastic layer is molded. For that reason, molding is made by causing the liquid rubber to flow in a direction in which a flow of heat in the elastic layer and by extension in the elastic roller is intended to be increased, whereby the flow of heat in the direction (y direction) can be made larger than the flow of heat in other directions.

It is an object of this embodiment to enhance the thermal conductivity of the elastic roller with respect to a direction perpendicular to a recording material direction, i.e., with respect to the axial direction (y direction). For that reason, an injection direction of the liquid rubber when the rubber layer is molded is made equal to a longitudinal direction (y direction) of the base material 4a, so that an orientation direction of the needle-like filler is intended to be unified into y direction. As a result, when small-sized paper is passed through the fixing device 10, it becomes possible to suppress that a temperature of a rotate portion which is the non-sheet-passing portion is excessively increased. That is, even when the non-sheet-passing portion of the roller increases in temperature, the heat easily flow toward a sheet-passing portion relatively low in temperature or toward end portions with respect to the axial direction of the roller. In other words, the heat is efficiently dissipated toward the sheet-passing portion or the end portions of the roller.

The thickness of the elastic layer 4b is not particularly restricted if the thickness is to the extent that the fixing nip N having a desired width with respect to the recording material feeding direction is capable of being formed when an entirety of the elastic layer is elastically deformed in contact with the fixing belt 3, but may preferably be 2.0 mm-10.0 mm. A hardness of the elastic layer 4b may preferably be in a range of 20° or more and 70° or less from the viewpoint of ensuring the nip N having the desired width.

As described above, the needle-like filler is mixed in the elastic layer 4b. This needle-like filler is a bar-like member having a shape of, e.g., a cylindrical shape or a polygonal prism shape, and is a member large in ratio of a length to a diameter, i.e., high in aspect ratio. The aspect ratio may preferably be 4.5-200. As the needle-like filler, pitch-based carbon fibers of 500 W/(m·K) or more in thermal conductivity with respect to a filler longitudinal direction are used.

The pitch-based carbon fibers are carbon fibers manufactured from "pitch" which is a petroleum refining by-product or a coal carbonization by-product, and depending on a crystal state of the pitch subjected to spinning, are classified into a mesophase pitch type and an isotropic pitch type. Particularly, mesophase pitch-based carbon fibers obtained by subjecting a mesophase pitch showing optical anisotropy have such a feature that the fibers have high thermal conductivity and elastic modulus, and on the other hand have a very small thermal expansion coefficient.

The pitch-based carbon fibers used as the needle-like filler mixed in the elastic layer 4b may preferably be about 5 µm-11 µm in average diameter and about 50 µm-1000 µm in average length. This is because when the average length is shorter than 50 µm, an anisotropic effect (thermal conductivity anisotropy) does not readily exhibit with respect to the thermal conductivity of the elastic layer 4b. On the other hand, this is because when the average length is longer than 1000 µm, it becomes difficult to disperse the fibers into the elastic layer 4b.

Further, a dispersion content of the needle-like filler in the elastic layer 4b may desirably be 5%-40% in volume ratio. This is because when the dispersion content of the needle-like filler is less than 5% in volume ratio, the thermal conductivity cannot be enhanced and the thermal conductivity enough to suppress generation of the non-sheet-passing portion temperature rise cannot be obtained. On the other hand, this is because when the dispersion content of the needle-like filler exceeds 40% in volume ratio, the flowability of the liquid rubber lowers and it becomes difficult to process and mold the elastic layer, and the hardness increases and a function as the elastic layer becomes lost.

<Parting Layer>

The parting layer 4c is a fluorine-containing resin layer. The parting layer 4c is formed by coating the outer periphery of the elastic layer 4b with, e.g., a perfluoroalkoxyalkane (PFA) resin tube. Alternatively, the parting layer 4c may also be formed by applying, onto the outer periphery of the elastic layer 4b, paint consisting of a fluorine-containing resin material such as polytetrafluoroethylene (PTFE) or tetrafluoroethylene-hexafluoropropylene copolymer (FEP). The thickness of the parting layer 4c is not particularly restricted, but may preferably be about 15 µm-80 µm. This parting layer 4c is provided so that the toner is not readily deposited on the pressing roller 4.

Incidentally, between the elastic layer 4b and the parting layer 4c, depending on the purpose such as supply of electric power or the like, a primer layer (adhesive layer) may also be provided.

[Manufacturing Method of Elastic Roller]

In the following, a manufacturing method of the pressing roller (elastic roller), suitable for being used as the pressing roller 4 described above, including the cylindrical base material 4a and the rubber layer 4b which is molded concentrically with the base material 4a and which contains the needle-like filler will be described.

<Metal Mold>

Figure 3:
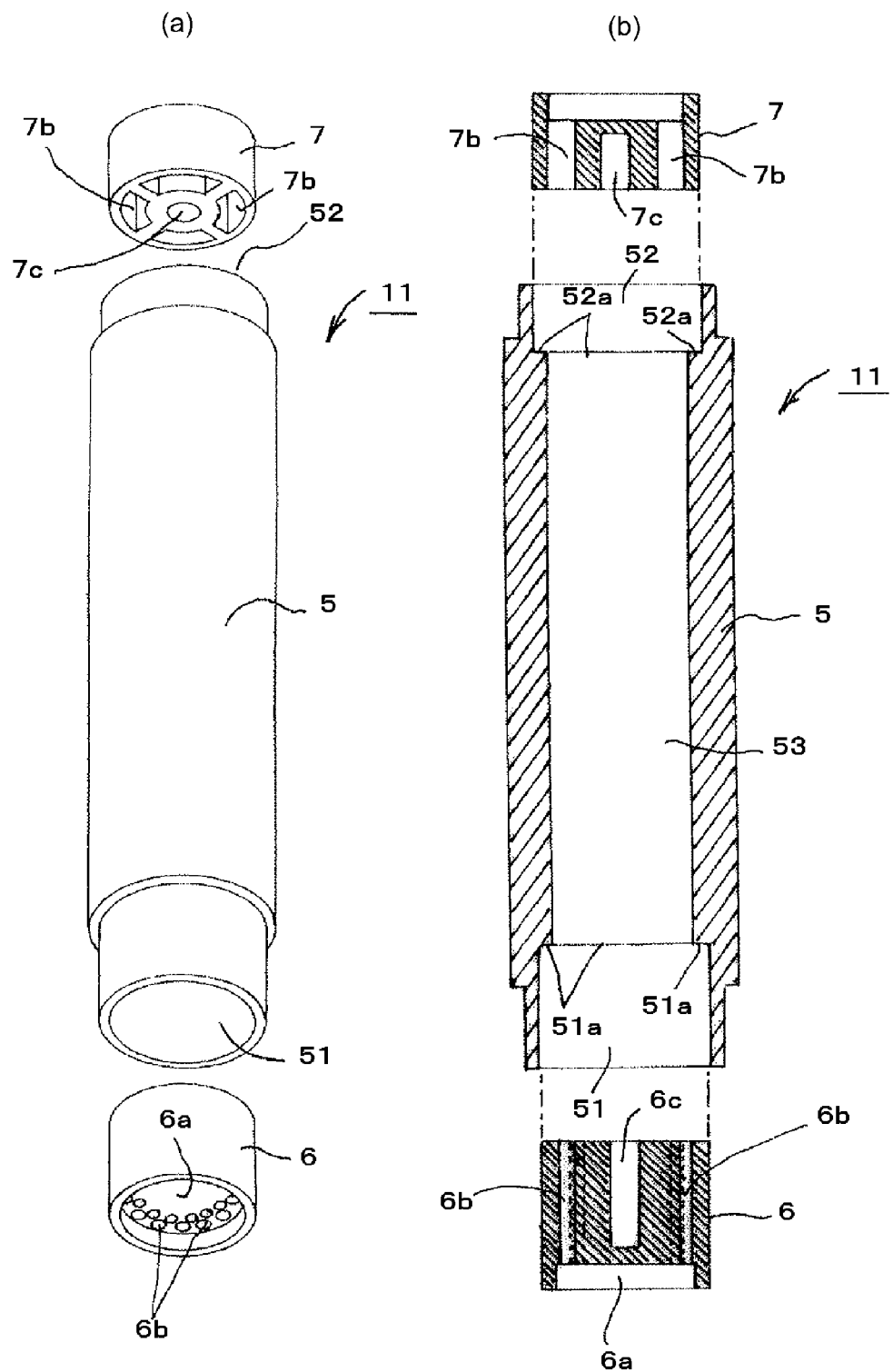
In FIG. 3, (a) and (b) are illustrations of a structure of a metal mold.

In FIG. 3, (a) is an exploded perspective view of a metal mold 11 used in casting manufacturing of the pressing roller in this embodiment. The metal mold 11 includes a hollow metal mold (hollow cylindrical metal mold, cylindrical mold) 5 having a cylindrical molding space (hereinafter referred to as a cavity) 53, and a one end-side piece mold (inserting mold) 6 and the other end-side piece mold 7 mounted into (connected with) a one end-side opening 51 and the other end-side opening 52, respectively, of the hollow metal mold 5. In FIG. 3, (b) is a longitudinal sectional view of the hollow metal mold 5, the one end-side piece mold 6 and the other end-side piece mold 7.

The one end-side piece mold 6 is a piece mold (injecting member) for permitting injection of the liquid rubber into the cavity 53 of the hollow metal mold 5. The other end-side piece mold 7 is a piece mold (discharging member) for permitting discharge of air pushed out from the inside of the cavity 53 with the injection of the liquid rubber into the cavity 53.

Figure 4:
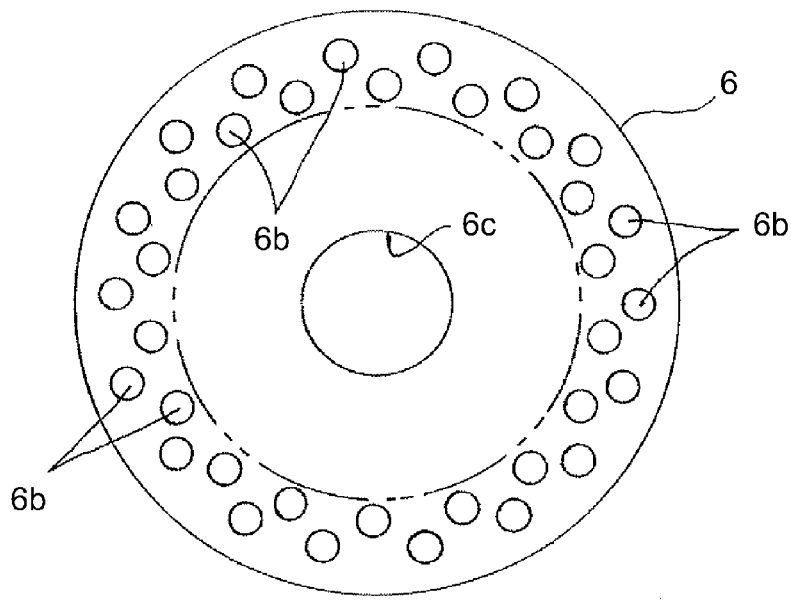
In FIG. 4, (a) and (b) are illustrations of injection holes provided in one end-side piece mold (inserting mold).
Figure 4:
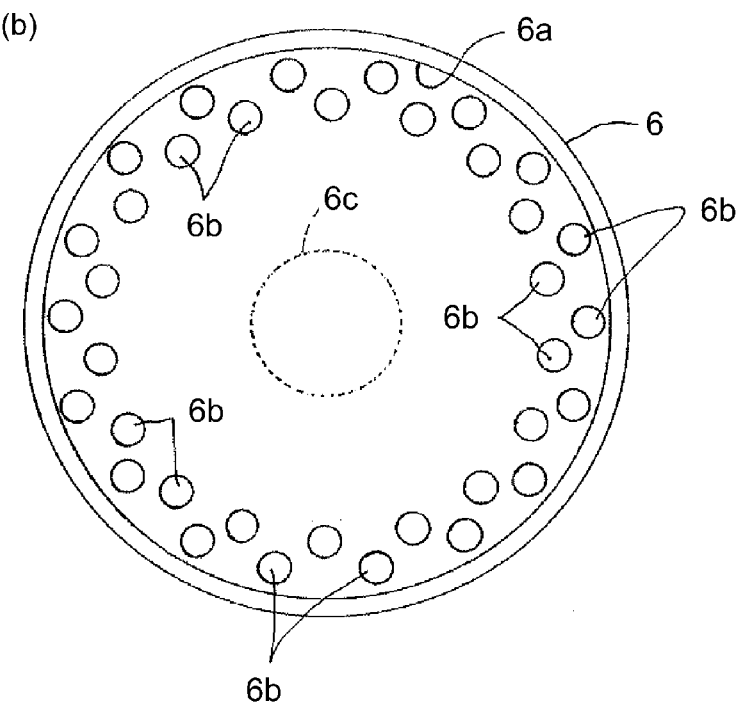

In FIG. 4, (a) is a plan view (cavity-side end surface view) of the one end-side piece mold 6, and (b) is a bottom view (end surface view in a side opposite from the cavity side) of the one end-side piece mold 6. At a central portion of the one end-side piece mold 6 in the plan view, a central hole 6c as a base material holding portion into which the one end-side small-diameter shaft portion 4a-1 of the base material 4a is to be inserted is provided. Further, in the bottom side, a circumferential hole (hollow, recessed portion) 6a is provided. Further, the circumferential hole 6a is provided with a plurality of liquid rubber injection holes 6b which are disposed from the upper surface side to the bottom side along a circumference of the circumferential hole 6a.

Further, at an upper surface central portion (cavity-side end surface central portion) of the other end-side piece mold 7, a central hole 7c as a base material holding portion into which the other end-side small-diameter shaft portion 4a-2 of the base material 4a is to be injected is provided. Then, a plurality of discharging holes 7b are provided from the upper surface side to the bottom side.

The one end-side piece mold 6 is engaged into the one end-side opening 51 from the upper surface side and is inserted sufficiently until a circumferential edge portion in the upper surface side is abutted against and received by a circular stepped portion 51a on an inner peripheral surface of the opening, so that the one end-side piece mold 6 is mounted in the one end-side of the hollow metal mold 5. Further, the other end-side piece mold 7 is engaged into the other end-side opening 52 from the upper surface side and is inserted sufficiently until a circumferential edge portion in the upper surface side is abutted against and received by a circular stepped portion 52a on an inner peripheral surface of the opening, so that the one end-side piece mold 6 is mounted in the other end-side of the hollow metal mold 5.

<Placement of Base Material in Metal Mold>

Onto the base material 4a, a primer for the silicone rubber was applied in advance at a portion where the rubber elastic layer 4b is to be formed, and then was baked in an oven with internal hot air circulation. As shown in (a) of FIG. 5, the one end-side piece mold 6 is mounted into the one end-side opening 51 of the hollow metal mold 5. Then, as shown in (b) of FIG. 5, the above-described base material 4a is inserted into the hollow metal mold 5 through the other end-side opening 52 from the one end-side small-diameter shaft portion 4a-1 side, and then the small-diameter shaft portion 4a-1 is inserted into and held by the upper surface-side central hole 6c of the one end-side piece mold 6.

Figure 5:
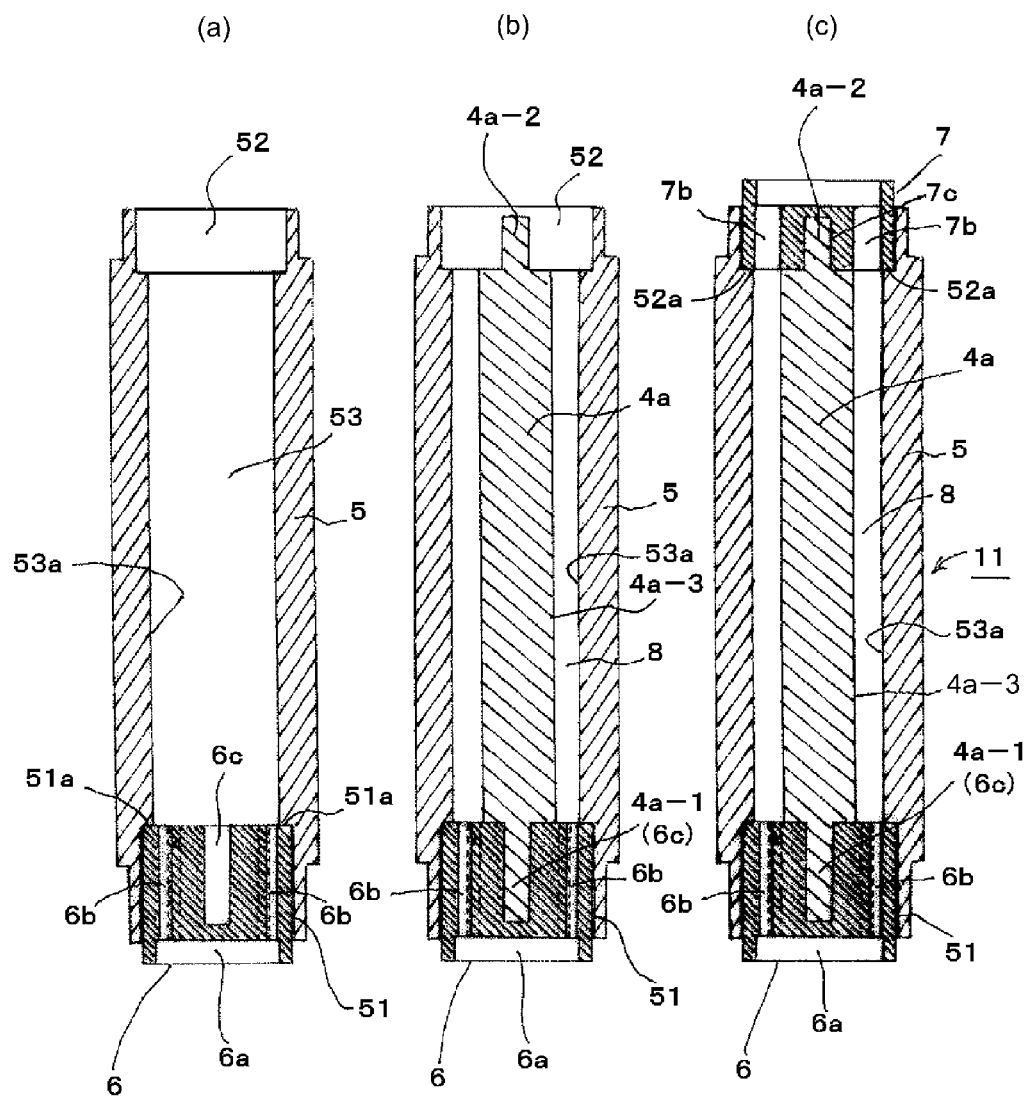
In FIG. 5, (a)-(c) are illustrations of a manner of disposing a roller base material in the metal mold.

Then, as shown in (c) of FIG. 5, the other end-side piece mold 7 is mounted into the hollow metal mold 5 through the other end-side opening 52 in a state in which the other end-side small-diameter shaft portion 4a-2 of the base material 4a is inserted into and supported by the upper surface-side central hole 7c.

As a result, the base material 4a is concentrically positioned and held at the cylindrical central portion of the cylindrical cavity 53 of the metal mold 5 in a state in which the one end-side and the other end-side small-diameter shaft portions 4a-1 and 4a-2 are supported by the central holes 6c and 7c of the one end-side and the other end-side piece molds 6 and 7, respectively. Further, between a cylinder molding surface (inner peripheral surface) 53a of the cylindrical cavity 53 and an outer surface (outer peripheral surface) 4a-3 of the base material 4a, a gap (spacing) 8 for permitting cast molding of the rubber elastic layer 4b having a predetermined thickness is formed around the outer periphery of the base material 4a.

Incidentally, the placement of the base material 4a in the cavity 53 of the metal mold 11 is not limited to the above-described procedure. The hollow metal mold 5, the base material 4a, the one end-side piece mold 6 and the other end-side piece mold 7 may only be finally assembled as shown in (c) of FIG. 5.

<Casting of Liquid Rubber>

Figure 6:
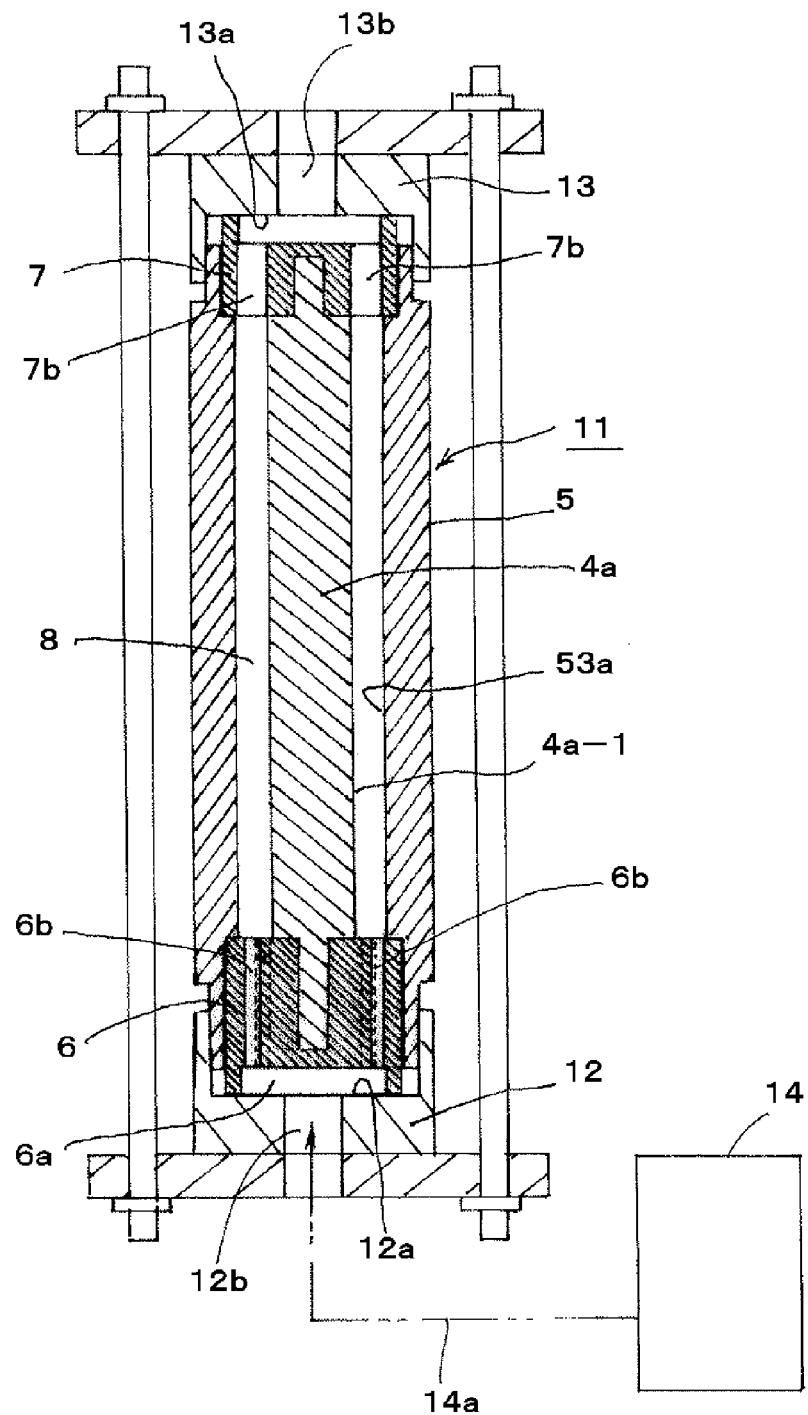
FIG. 6 is an illustration of a casting step.

The metal mold 11 in which the base material 4a is provided in the cavity 53 as described above is, as shown in FIG. 6, pressed and fixed in a vertical attitude between a lower-side jig 12 and an upper-side jig 13 which oppose each other while the one end-side piece mold 6 side is a lower side with respect to a direction of gravity and the other end-side piece mold 7 side is an upper side with respect to the direction of gravity. The one end-side piece mold (hereinafter referred to as a lower piece mold) 6 of the metal mold 11 is engaged into and received by a receiving hole 12a of the lower-side jig 12. The other end-side piece mold (hereinafter referred to as an upper piece mold) 7 of the metal mold 11 is engaged into and received by a receiving hole 13a of the upper-side jig 13.

That is, the metal mold 11 is held between the lower-side jig 12 and the upper-side jig 13 in an attitude state in which a cylindrical axial line of the cylindrical cavity 53 is vertically directed and a side where the injection holes (openings) 6b are disposed is the lower side, and then a casting step is performed. Incidentally, the metal mold 11 may also have a constitution using several divided metal molds in combination during molding.

At a central portion of the receiving hole 12a of the lower-side jig 12, a liquid rubber injection port 12b is provided. To the liquid rubber injection port 12b, a liquid rubber supplying pipe 14a of an external liquid rubber supplying device 14 is connected. At a central portion of the receiving hole 13a of the upper-side jig 13, a discharging port 13b is disposed.

The liquid rubber supplying device 14 is driven, and the liquid rubber passes through the liquid rubber supplying pipe 14a and enters the receiving hole 12a through the injection port, so that the liquid rubber is filled in a space portion constituted by the receiving hole 12a and the circumferential hole 6a in the bottom side of the lower piece mold 6.

With subsequent supply of the liquid rubber, the filled liquid rubber passes through the plurality of liquid rubber injection holes 6b provided along the circumference of the circumferential hole 6a and flows from the bottom side toward the upper surface side of the lower piece mold 6. Then, the liquid rubber is injected into the gap 8 formed between the cylinder molding surface 53a of the cylindrical cavity 53 and the outer surface 4a-3 of the base material 4a. With further subsequent supply of the liquid rubber, the injection of the liquid rubber into the gap 8 has advanced from below to above in the direction of gravity. Air existing in the gap 8 is pushed up from below in the gap 8 with the injection of the liquid rubber into the gap 8 from below toward above, so that the liquid rubber passes from the gap 8 through a discharging hole 7b of the upper piece mold 7 and the discharging port 13b of the upper-side jig 13, and comes out of the metal mold 11.

The injection of the liquid rubber into the gap 8 through the respective liquid rubber injection holes 6b of the lower-side piece mold 6 is averagely made with respect to a circumferential direction of the gap 8. In addition, the base material 4a is in a state in which the base material 4a is concentrically fixed at the cylindrical central portion of the cavity 53 by the upper and lower members 7 and 6, and is not moved by the injection of the liquid rubber, so that the gap 8 can be filled with the liquid rubber adequately without generating thickness deviation (non-uniformity).

At this time, the flow of the liquid rubber along the axial direction of the base material 4a in the gap 8 created by the cavity 53 and the base material 4a varies depending on a shape of the injection holes 6b. As the axial direction flow of the liquid rubber is uniform with respect to a radial direction and the circumferential direction of the gap 8, the needle-like filler dispersed in the liquid rubber is uniformly oriented along the flow of the liquid rubber, and therefore the thermal conductivity with respect to the axial direction can be efficiently enhanced.

The injection of the liquid rubber into the metal mold 11 is performed at least until the gap 8 is sufficiently filled with the liquid rubber. The discharging hole 7b of the upper piece mold 7 is not required to the sufficiently filled with the liquid rubber. After the injection of the liquid rubber (after the end of the injecting step), the metal mold 11 is demounted from the upper and lower jigs 13 and 12. At this time, outer openings of the lower piece mold 6 and the upper piece mold 7 are hermetically sealed by mounting of a blind plate so that the injected liquid rubber does not flow through the outer openings of the lower piece mold 6 and the upper piece mold 7. Then, the liquid rubber in the metal mold 11 is cured by placing the entire metal mold 11 in the oven with internal hot air circulation or by a heating plate or the like surrounding the metal mold 11 (rubber curing step of curing the liquid rubber in the metal mold by heating the metal mold 11).

After the curing of the rubber, the metal mold 11 is appropriately cooled (water cooling or air cooling). Thereafter, the lower piece mold 6 and the upper piece mold 7 are demounted from the hollow metal mold 5, and then the roller in which the elastic layer 4b is laminated on the base material 4a is demolded from the hollow metal mold 5 (demolding step of demolding the elastic layer in the metal mold after the end of the rubber curing step).

With respect to demolding after the rubber curing, demounting of the lower piece mold 6 and the upper piece mold 7 from the hollow metal mold 5 is performed by pulling out the members 7 and 8 from the one end-side opening 51 and the other end-side opening 52, respectively, straightly or while twisting the piece molds 7 and 8 along the openings 51 and 52, respectively. This demounting is made against bond strength of association portion (connecting portion) between an end surface of the cured rubber layer of the elastic roller in the hollow metal mold 5 and the cured rubber layer in the holes 6b and 7b in the lower piece mold 6 and the upper piece mold 7, respectively.

Then, the elastic roller demolded from the hollow metal mold 5 is subjected to reforming for removing burrs and irregularity portion remaining on the one end-side and the other end-side of the elastic layer 4b, as desired.

<Formation of Parting Layer 4c>

Using an adhesive, the fluorine-containing resin-made tube which is the parting layer 4c is coated on the elastic layer 4b and is unified (parting layer-forming step). In the case where the elastic layer 4b and the parting layer 4c are interlayer-bonded to each other without using the adhesive, the adhesive may also be not used.

The parting layer 4c is not necessarily required to be formed finally in the step, but can be laminated also by a method in which a tube is mounted on an inner wall surface of the cavity of the hollow metal mold 5 in advance and then the liquid rubber is casted.

That is, in the above-described casting step, the resin tube constituting the parting layer 4c for coating the outer peripheral surface of the rubber elastic layer 4b is mounted on the cylindrical molding surface 53a of the cavity 53 of the hollow metal mold 5 in advance. Then, the liquid rubber is injected into the gap 8 formed between the inner peripheral surface of the resin tube and the outer surface 4a-3 of the base material 4a. The rubber curing step of curing the liquid rubber in the metal mold 11 by heating the metal mold 11 after the end of the casing step and the demolding step of demolding the elastic roller in the metal mold after the end of the rubber curing step are performed.

Further, after the elastic layer 4b is formed, it is also possible to form the parting layer 4c by a known method such as coating with a fluorine-containing resin material.

Here, a parting agent is applied onto a liquid contact surface of each of the lower piece mold 6 and the upper piece mold 7 in advance, and after the demolding, the liquid rubber remaining in each of the piece molds is removed, and then each of the piece molds is used again. When the parting agent is applied in advance, removal of the cured rubber remaining on the associated piece mold is easy. Also onto the molding surface 53a of the hollow metal mold 5, the parting agent is applied, whereby the demolding after the rubber curing becomes easy.

[Evaluation of Pressing Roller]

In the following, with respect to evaluation of the pressing roller 4 formed by the above-described elastic roller manufacturing method, description will be made using Embodiments 1-3 and Comparison Examples 1-3 described later. In this embodiment, each thermal conductivity is obtained for evaluation.

<Thermal Conductivity>

In this embodiment, the thermal conductivity is obtained for evaluation. The thermal conductivity is converted from thermal diffusivity. For measurement of the thermal diffusivity, a device of a type in which the thermal diffusivity is measured by a thermal-wave analytical method of a temperature variable type was used. As the device of this type, a thermal diffusivity measuring device such as "ai-Phase Mobile 2" (trade name, manufactured by ai-Phase Co., Ltd.) is used.

Using this device, the thermal diffusivity of the pressing roller 4 was measured with respect to each of the circumferential direction (x direction), the AD (y direction) and the thickness direction (z direction) of the pressing roller 4 as shown in (a) of FIG. 2. As shown in (b) of FIG. 2, for measurement of the thermal diffusivity with respect to the circumferential direction (x direction), the pressing roller 4 was cut along yz plane so as to have a thickness of 1 mm or less with respect to x direction and was used as a measured sample S. For measurement of the thermal diffusivity with respect to the axial direction (y direction), the pressing roller 4 was cut along zx plane so as to have a thickness of 1 mm or less with respect to y direction and was used as a measured sample S. For measurement of the thermal diffusivity with respect to the thickness direction (z direction), the pressing roller 4 was cut along xy plane so as to have a thickness of 1 mm or less with respect to z direction and was used as a measured sample S. Then, using these measured samples S, at a set temperature of 50° C., measurement of the thermal diffusivity was made 5 times with respect to each of the directions, and an average of 5 measured values was used as each of a circumferential direction thermal diffusivity, an axial direction thermal diffusivity and a thickness direction thermal diffusivity.

In order to convert the thermal diffusivity into the thermal diffusivity, there is a need to use values of density and specific heat capacity. For measurement of the density, a dry-type automatic density meter such as "Accupyc 1330" (trade name, manufactured by Shimadzu Corp.) is used. Further, for measurement of the specific heat capacity, a differential scanning calorimeter such as "DSC823" (trade name, manufactured by Mettler-Toredo International Inc.) is used. In this case, as a substance having a known specific heat capacity used as a reference for comparing the specific heat capacity, sapphire was used.

The measurement of the specific heat capacity by this measuring device was made 5 times, and an average of 5 measured values was used as the specific heat capacity. A thermal conductivity $\lambda$ was obtained by multiplying the thus-obtained density by the thus-obtained specific heat capacity, and then by multiplying a resultant value by the above-described thermal diffusivity.

<Index of Axial Orientation Property>

For evaluation of a degree of orientation of the needle-like filler along the axial direction in the elastic layer 4b, an axial orientation ratio (% $\lambda y$) was used. The axial orientation ratio (% $\lambda y$) is obtained by the following formula 1:

$$\text{Axial orientation ratio (\% } \lambda y) = \lambda y \times 100/(\lambda x + \lambda y + \lambda z) \text{ (\%)} \quad \text{formula 1.}$$

Here, $\lambda x$ is the thermal conductivity of the elastic layer 4b with respect to the circumferential direction, $\lambda y$ is the thermal conductivity of the elastic layer 4b with respect to the axial direction, and $\lambda z$ is the thermal conductivity of the elastic layer 4b with respect to the thickness direction. It can be said that with a higher axial orientation ratio (% $\lambda y$), the needle-like filler in a larger amount is oriented in the axial direction in the elastic layer 4b.

<Image Evaluation>

Evaluation of an image stripe capable of generating periodically with respect to the rotational direction of the pressing roller 4, i.e., the sheet feeding direction by a weld line generated during the casting of the liquid rubber was made in the following manner. In the above-described fixing device 10, after the surface temperature of the fixing belt 3 reaches 180° C., A4-sized coated paper (trade name: "OK Topcoat", 84.9 g/m$^2$, manufactured by Oji Holdings Corp.) on which an unfixed toner image is placed is passed through the fixing device 10 in a long edge feeding manner. Using a resultant toner-fixed image, the presence or absence of a periodical image stripe with respect to the feeding direction was discriminated by visual observation.

<Evaluation Result>

The evaluation was made with respect to each of the pressing rollers of Embodiments 1-3 and Comparison Examples 1-3 described later. Evaluation items are as follows.

Sb is a surface area per unit length (mm$^2$/mm) with respect to the injection direction at a portion where the injection holes 6b formed in the piece mold 6 contacts the liquid rubber. In other words, a total value (total perimeter) of the group of injection holes (openings) 6b when a cross section of a portion (a most downstream end with respect to the injection direction) of the member 6 along z-x plane in FIG. 2 is seen.

Sa is a surface area per unit length (mm$^2$/mm) with respect to the injection direction at the surface of the base material 4a contacting the liquid rubber in the metal mold 5 and at the inner surface of the cylindrical metal mold 5. In other words, the sum of a perimeter of the inner surface of the metal mold 5 and a perimeter of the outer surface of the base material 4a.

Sb/Sa can be obtained from the above-described Sb and Sa. Further, in other words, Sb/Sa is a ratio of the total perimeter of the group of the injection holes (openings) 6b to the sum of the perimeter of the inner surface of the metal mold 5 and the perimeter of the outer surface of the base material 4a. That is, in this embodiment, as described later, at the most downstream end of the piece mold 6 with respect to the injection direction, in order to increase the portion of contact of the liquid rubber with the piece mold 6, Sb/Sa is set at 1.3 or more.

λy is the thermal conductivity (W/(m·K)) of the elastic layer 4b with respect to the axial direction.

% λy is the axial orientation ratio (%).

The image stripe is an inconvenience generating due to a factor described layer.

That is, when the thickness of the rubber layer to be molded becomes thick, i.e., as a width of the gap becomes larger, the flow of the liquid rubber becomes turbulent flow, so that the orientation of the needle-like filler becomes non-uniform. At this time, shearing stress exerted on the liquid rubber is large in the neighborhood of the surface of the molding space portion of the metal mold and in the neighborhood of the outer peripheral surface of the core metal, and therefore the needle-like filler is readily oriented in a flowing direction, but in the neighborhood of the central portion of the gap, the orientation is disturbed by the turbulent flow.

As a result, an orientation state is different between a portion where the needle-like filler is oriented and a portion where the needle-like filler is not oriented, so that non-uniformity generates in surface hardness of the rubber layer after the liquid rubber is cured. In the case where the pressing roller in such a state is used, by the non-uniformity in surface hardness, the periodical image stripe appears.

The above results are summarized in Table 1.

TABLE 1

| | SaA*[1] | SbA*[2] | SAR*[3] | TC*[4] | AOR*[5] | IS*[6] |
|---|---|---|---|---|---|---|
| Symbol | Sa | Sb | Sb/Sa | λy | %λy | — |
| Unit | mm²/mm | mm²/mm | — | W/(m · K) | % | — |
| EMB. 1 | 170 | 226 | 1.3 | 3.0 | 73 | ○ |
| EMB. 2 | 170 | 343 | 2.0 | 3.5 | 82 | ○ |
| EMB. 3 | 170 | 565 | 3.3 | 4.8 | 87 | ○ |
| COMP. EX. 1 | 170 | 94 | 0.6 | 2.4 | 43 | x |
| COMP. EX. 2 | 170 | 183 | 1.1 | 1.6 | 40 | x |
| COMP. EX. 3 | 170 | 678 | 4.0 | 1.3 | 72 | ○ |

*[1]"SaA" is the layer contact surface area in the metal mold.
*[2]"SbA" is the layer contact surface area in the injection holes.
*[3]"SAR" is the surface area ratio.
*[4]"TC" is the thermal conductivity with respect to the axial direction.
*[5]"AOR" is the axial orientation ratio.
*[6]"IS" is the image stripe.

An iron-mode core metal of 24 mm in outer diameter was used as the base material 4a and was common to all the pressing rollers in Embodiments 1-3 and Comparison Examples 1-3. As the primer applied onto the peripheral surface of the core metal, "DY39-051" (trade name, manufactured by Dow Corning Toray Co., Ltd.) was used. The primer was applied onto the core metal peripheral surface, and thereafter was baked at 180° C. for 30 minutes in the oven with internal hot air circulation.

As a liquid rubber mixture for the elastic layer 4b formed on the core metal peripheral surface, a mixture in which as the needle-like filler, pitch-based carbon fibers "GRANOC Milled Fiber XN-100-25 M" (trade name, manufactured by Nippon Graphite Fiber Co., Ltd.) of 9 μm in average fiber diameter, 250 μm in average fiber length and 900 W/(m·K) in thermal conductivity was used and was mixed and dispersed in an addition reaction cross-linking type liquid silicone rubber of 50,000 in weight-average molecular weight with a volume ratio of 10% was used.

As the parting layer 4c, a fluorine-containing resin (PFA) tube of 29.5 mm in inner diameter was used, and the fluorine-containing resin tube inserted into the hollow metal mold 5 of 30.2 mm in inner diameter in advance was folded back toward the outer wall surface of the hollow metal mold 5 at end portions thereof, and thus was disposed on the inner wall surface of the cylindrical metal mold.

Onto the inner surface of the fluorine-containing resin tube mounted on the inner wall surface of the cylindrical metal mold, a primer "DY39-067" (trade name, manufactured by Dow Corning Toray Co., Ltd.) was applied, and then was dried at 70° C. for 20 minutes in the oven with internal hot air circulation. The core metal after being subjected to the primer processing (application) was provided concentrically in the hollow metal mold 5, and the piece molds 6 and 7 were engaged with the lower and upper end portions of the hollow metal mold 5 and, then the core metal was fixedly disposed concentrically in the hollow cylindrical metal mold by pressing the hollow cylindrical metal mold and the piece molds at the end portions with the jigs.

The liquid rubber mixture in which the above-described needle-like filler is mixed and disposed was injected into between the core metal and the fluorine-containing resin tube disposed on the metal mold inner wall, and the piece molds at the metal mold end portions are hermetically sealed. Then, the entire metal mold was left standing for 4 hours in the oven with internal hot air circulation kept at 200° C., so that the liquid rubber mixture was cured, and at the same time, the core metal, the rubber and the tube are bonded and unified. After the metal mold is cooled with water, the tube-coated roller was demolded from the metal mold.

Through the above-described steps, the pressing rollers in Embodiments 1-3 and the pressing rollers in Comparison Examples 1-3 were obtained. Each of the pressing rollers in which the base material 4a, the elastic layer 4b and the parting layer 4c was 30 mm in outer diameter, and the thickness of the elastic layer 4b was 3.0 mm.

Embodiment 1

In Embodiment 1, as the lower piece mold 6 in the liquid rubber injection side, a piece mold having injection holes 6b, each having an inner diameter of 2 mm, provided in two columns at 36 positions along the circumferential direction as shown in (a) of FIG. 4 was used. Then, the liquid rubber mixture was injected into between the fluorine-containing resin tube mounted on the metal mold inner wall and the core metal disposed concentrically with the metal mold.

The surface area Sb per unit length with respect to the injection direction at the portion where the injection holes 6b contacted the liquid rubber was 1.3 times the surface area Sb per unit length with respect to the injection direction at the core metal surface contacting the liquid rubber in the cylindrical metal mold and at the cylindrical metal mold inner surface.

Embodiment 2

Figure 7:
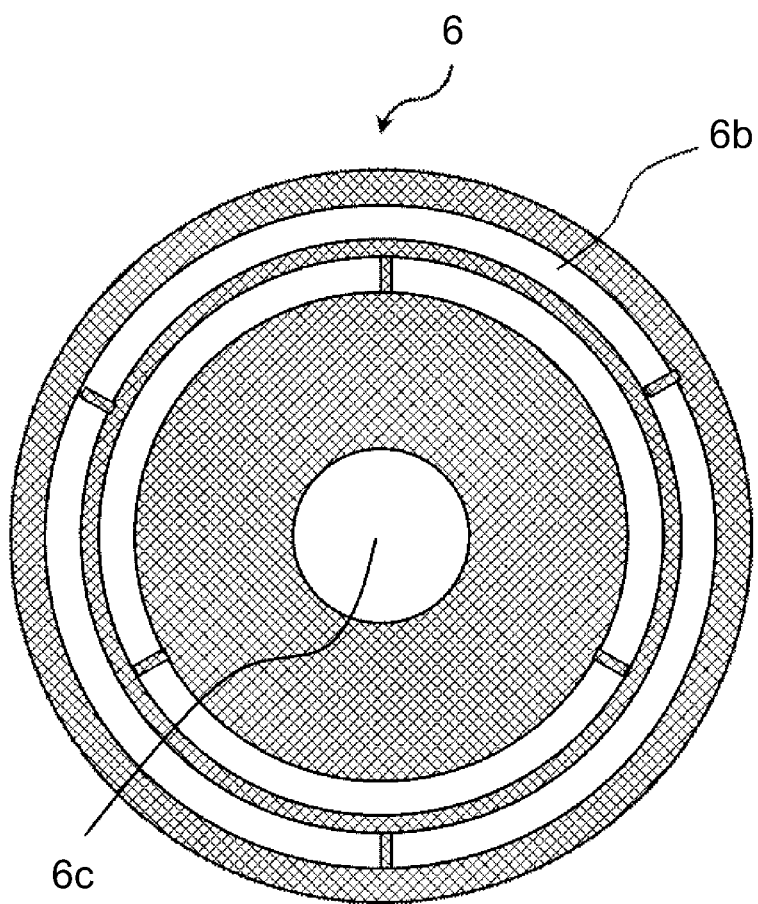
FIG. 7 is an illustration of another example of the injection holes provided in one end-side piece mold.

In Embodiment 2, as the lower piece mold 6 in the liquid rubber injection side, a piece mold having injection holes (circumferential holes) 6b divided into two groups with respect to the radial direction each having a width of 1.3 mm with respect to the radial direction and each divided into 3 portions with respect to the circumferential direction at regular intervals of 120° as shown in (a) of FIG. 7 was used. Then, the liquid rubber mixture was injected into between the fluorine-containing resin tube mounted on the metal mold inner wall and the core metal disposed concentrically with the metal mold.

The surface area Sb per unit length with respect to the injection direction at the portion where the injection holes 6b contacted the liquid rubber was 2.0 times the surface area Sb per unit length with respect to the injection direction at the core metal surface contacting the liquid rubber in the cylindrical metal mold and at the cylindrical metal mold inner surface.

Embodiment 3

Figure 8:
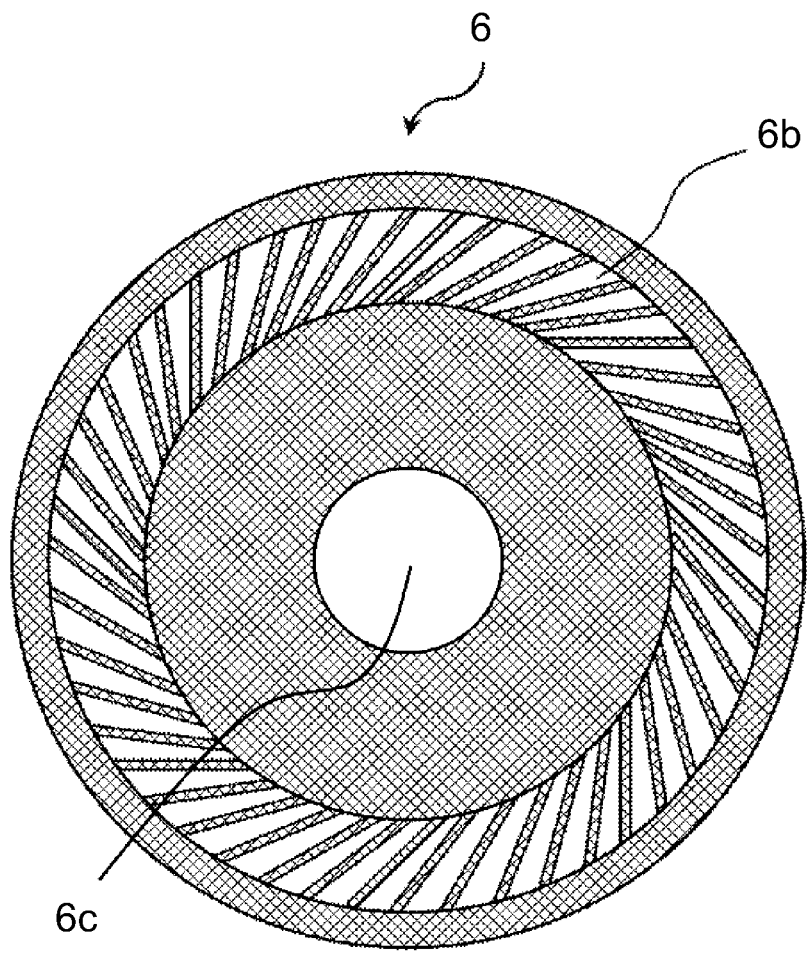
FIG. 8 is an illustration of a further example of the injection holes provided in one end-side piece mold.

In Embodiment 3, as the lower piece mold 6 in the liquid rubber injection side, a piece mold having divided 48 injection holes (circumferential holes) 6b each provided so that an injection hole inner wall forms an angle of 30° with a tangential line of the piece mold as shown in (a) of FIG. 8 was used. Then, the liquid rubber mixture was injected into between the fluorine-containing resin tube mounted on the metal mold inner wall and the core metal disposed concentrically with the metal mold.

The surface area Sb per unit length with respect to the injection direction at the portion where the injection holes 6b contacted the liquid rubber was 3.3 times the surface area Sb per unit length with respect to the injection direction at the core metal surface contacting the liquid rubber in the cylindrical metal mold and at the cylindrical metal mold inner surface.

Comparison Example 1

In Comparison Example 1, as the lower piece mold 6 in the liquid rubber injection side, a piece mold which is of a modified type of the piece mold shown in FIG. 4 and which has injection holes 6b, each having an inner diameter of 2.5 mm, provided in one column at 12 positions along the circumferential direction was used. Then, the liquid rubber mixture was injected into between the fluorine-containing resin tube mounted on the metal mold inner wall and the core metal disposed concentrically with the metal mold.

The surface area Sb per unit length with respect to the injection direction at the portion where the injection holes 6b contacted the liquid rubber was 0.6 time the surface area Sb per unit length with respect to the injection direction at the core metal surface contacting the liquid rubber in the cylindrical metal mold and at the cylindrical metal mold inner surface.

Comparison Example 2

In Comparison Example 2, as the lower piece mold 6 in the liquid rubber injection side, a piece mold which is of a modified type of the piece mold shown in FIG. 7 and which has injection holes (circumferential holes) 6b, each having a width of 3.1 mm with respect to a radial direction, divided into 3 portions with respect to the circumferential direction at regular intervals of 120° was used. Then, the liquid rubber mixture was injected into between the fluorine-containing resin tube mounted on the metal mold inner wall and the core metal disposed concentrically with the metal mold.

The surface area Sb per unit length with respect to the injection direction at the portion where the injection holes 6b contacted the liquid rubber was 1.1 times the surface area Sb per unit length with respect to the injection direction at the core metal surface contacting the liquid rubber in the cylindrical metal mold and at the cylindrical metal mold inner surface.

Comparison Example 3

In Comparison Example 3, as the lower piece mold 6 in the liquid rubber injection side, a piece mold which is of a modified type of the piece mold shown in FIG. 8 and which has injection holes (circumferential hole) 6b, each having an inner diameter of 0.5 mm, provided in 6 columns at 432 positions along the circumferential direction was used. Then, the liquid rubber mixture was injected into between the fluorine-containing resin tube mounted on the metal mold inner wall and the core metal disposed concentrically with the metal mold.

The surface area Sb per unit length with respect to the injection direction at the portion where the injection holes 6b contacted the liquid rubber was 4.0 times the surface area Sb per unit length with respect to the injection direction at the core metal surface contacting the liquid rubber in the cylindrical metal mold and at the cylindrical metal mold inner surface.

Each of the pressing rollers in Embodiment 1-3 is 3.0 W/(m·K) or more in thermal conductivity "λy" with respect to the axial direction and 70% or more in axial orientation ratio "% λy". If the thermal conductivity with respect to the axial direction is 3.0 W/(m·K) or more, it is possible to impart a thermal conductivity enough to suppress generation of the non-sheet-passing portion temperature rise. Further, if the axial orientation ratio is 50% or more, it can be said that the needle-like filler can be effectively oriented in the axial direction as intended as the manufacturing method of the elastic roller having the elastic layer high in thermal conductivity with respect to the axial direction.

Further, in Embodiments 1-3, with a larger ratio of the surface area Sb described above to the surface area described above (hereinafter referred to as a layer contact areas ratio Sb/Sa), there is a tendency that "λy" and "% λy" become larger.

That is, by increasing the layer contact area during the liquid rubber injection by the number and the shape of the injection holes 6b, the shearing stress exerted on the liquid rubber in the cylindrical metal mold with respect to the injection direction, i.e., the axial direction can be increased uniformly over the radial direction and the circumferential direction. For that reason, also the needle-like filler dispersed in the liquid rubber is uniformly oriented in the axial direction. Further, on the fixed toner image, the periodical image stripe due to the pressing roller was not observed. Also from this result, it can be said that the needle-like filler is uniformly oriented in the axial direction with no non-uniformity over the radial direction and the circumferential direction of the pressing roller.

On the other hand, in each of Comparison Examples 1 and 2, the thermal conductivity "λy" with respect to the axial direction is less than 3.0 W/(m·K) and the axial orientation ratio is less than 50%. This means that non only these values are insufficient to suppress the generation of the non-sheet-passing portion temperature rise but also the needle-like filler is not effectively oriented in the axial direction.

Further, in Comparison Example 1, on the fixed toner image, density non-uniformity in the form of 12 periodical stripes was observed in one-full-circumference of the pressing roller with respect to the pressing roller rotational direction. Also in Comparison Example 2, in one-full-circumference of the pressing roller, the density non-uniformity in the form of 3 periodical stripes was observed. These are based on the following reason. The orientation state of the needle-like filler is different between a portion of a weld line formed at a phase in the neighborhood of an intermediary position of adjacent injection holes and a portion of no weld line. This difference in orientation state depending on the circumferential phase conspicuously appears as surface hardness non-uniformity of the elastic roller since the layer contact areal ratio Sb/Sa of the injection holes 6b is low.

On the other hand, in Comparison Example 3, the axial orientation ratio "% λy" is 70% or more, but the thermal conductivity "λy" is less than n3.0 W/(m·K). This is because the layer contact areal ratio Sb/Sa is excessively large, and therefore the needle-like filler cannot pass through the injection holes 6b but stagnate in front of the injection holes 6b. That is, when the layer contact areal ratio Sb/Sa of the injection holes 6b is excessively large, although the ratio Sb/Sa is effective in orientation of the needle-like filler in the axial direction, due to flow loss of the needle-like filler, a desired thermal conductivity cannot be obtained.

As described above, the layer contact areal ratio Sb/Sa of the injection holes 6b provided in the member 6 mounted at the end portion of the hollow cylindrical metal mold in the liquid rubber injection side was set at a large value to the possible extent in a range free from an inconvenience such as clogging with the filler.

Specifically, from the results of Embodiments 1-3 and Comparison Examples 1-3 summarized in Table 1, the following technical matter was derived. The surface area per unit length with respect to the injection direction at the portion where the injection holes 6b contact the liquid rubber is Sb. Further, the surface area per unit length with respect to the injection direction at the cylindrical molding surface of the molding space portion 53 contacting the liquid rubber in the gap 8 and at the outer surface of the base material 4a is Sa. With respect to the layer contact areal ratio Sb/Sa between the surface area Sb and the surface area Sa, the surface areas Sb and Sa are set at such a relationship that the surface area Sb is 1.3 times or more and 33 times or less the surface area Sa.

In other words, the number, the size and the shape of the injection holes of the piece mold 6 is set so that the ratio of the total perimeter of the group of the injection holes (openings) 6b to the sum of the perimeters of the inner surface of the metal mold 5 and the outer surface of the base material 4 is 1.3 times or more and 3.3 times or less. The sum of the perimeters of the inner surface of the metal mold 5 and the outer surface of the base material 4 is a substantially equal value at any of positions of the metal mold 5 (pressing roller) with respect to a longitudinal direction. Incidentally, in the case where the sum Sa of the perimeters of the inner surface of the metal mold 5 and the outer surface of the base material 4 is not uniform with respect to the longitudinal direction of the metal mold 5, measurement was made at many points with respect to the longitudinal direction of the metal mold 5, and an average of measured values is employed as Sa.

As a result, the liquid rubber mixture injected through the injection holes 6b is oriented in a direction along the axial direction of other base material 4a (the longitudinal direction of the metal mold 5) uniformly over the radial direction and the circumferential direction without being disturbed inside the metal mold 5. In this way, it is possible to form the pressing roller in which the needle-like filler is oriented in the axial direction in the rubber layer and has the high thermal conductivity.

Here, the metal mold 5 may also assume a horizontal (lateral) attitude or an upside-down attitude. However, in the horizontal attitude or the upside-down attitude, there is a liability that the air is incorporated during the liquid rubber injection, and therefore the attitude in which the injection side is positioned in the lower side is preferable.

Incidentally, in the above-described embodiments, the pressing roller was described as an example, but the present invention is not limited thereto. For example, the present invention is also applicable to the fixing roller. Alternatively, the present invention is also applicable to a pressing belt and a fixing belt which include a base material such as polyimide, polyamideimide or polyether ether ketone or a base material consisting of a thin metal material such as stainless steel or nickel.

While the invention has been described with reference to the structures disclosed herein, it is not confined to the details set forth and this application is intended to cover such modifications or changes as may come within the purpose of the improvements or the scope of the following claims.

This application claims the benefit of Japanese Patent Applications Nos. 2014-128146 filed on Jun. 23, 2014 and 2015-103560 filed on May 21, 2015, which are hereby incorporated by reference herein in their entirety.

What is claimed is:

1. A manufacturing apparatus for manufacturing a fixing member, comprising:
   a metal mold capable of holding a base material of the fixing member in an inside thereof; and
   an injecting member including a group of openings configured to inject a liquid rubber containing a needle-shaped filler into the metal mold in which the base material is held,
   wherein the injecting member is configured so that a ratio of a total perimeter of the group of openings to a sum of a perimeter of an inner surface of the metal mold and an outer surface of the base material is from 1.3 to 3.3.

2. The manufacturing apparatus according to claim 1, wherein the injecting member is connected to a lower portion of the metal mold with respect to a direction of gravity.

3. The manufacturing apparatus according to claim 1, further comprising a heating device configured to heat the metal mold to cure the liquid rubber in the metal mold.

4. The manufacturing apparatus according to claim 1, further comprising a device configured to form a layer of a fluorine-containing resin material on an outer peripheral surface of a cured rubber taken out of the metal mold.

5. The manufacturing apparatus according to claim 1, further comprising a holding device configured to hold a fluorine-containing resin tube on the inner surface of the metal mold,
   wherein the liquid rubber in injected between an inner surface of the fluorine-containing resin tube and the outer surface of the base material.

6. The manufacturing apparatus according to claim 5, further comprising a heating device configured to heat the metal mold to cure the liquid rubber in the metal mold.

7. The manufacturing apparatus according to claim 1, further comprising a discharging member, connected to the metal mold, configured to permit discharge of air from the metal mold with injection of the liquid rubber.

* * * * *